May 6, 1930.  J. J. FINNEGAN  1,757,362
ANTISKID DEVICE FOR MOTOR VEHICLES
Filed May 10, 1929

INVENTOR
John J. Finnegan
BY Caron & Caron.
ATTORNEYS

Patented May 6, 1930

1,757,362

UNITED STATES PATENT OFFICE

JOHN J. FINNEGAN, OF PORT STANLEY, ONTARIO, CANADA

ANTISKID DEVICE FOR MOTOR VEHICLES

Application filed May 10, 1929. Serial No. 361,903.

My invention relates to an antiskid device for motor vehicles, and pertains to that class wherein a gripping wheel is mounted adjacent the rear wheels of a car and which has means accessible to the driver of the vehicle to raise or lower the same.

The object of my invention is to simplify the construction of such devices and to render the same very positive in action and easily operated.

In the accompanying drawings—

Figure 1:
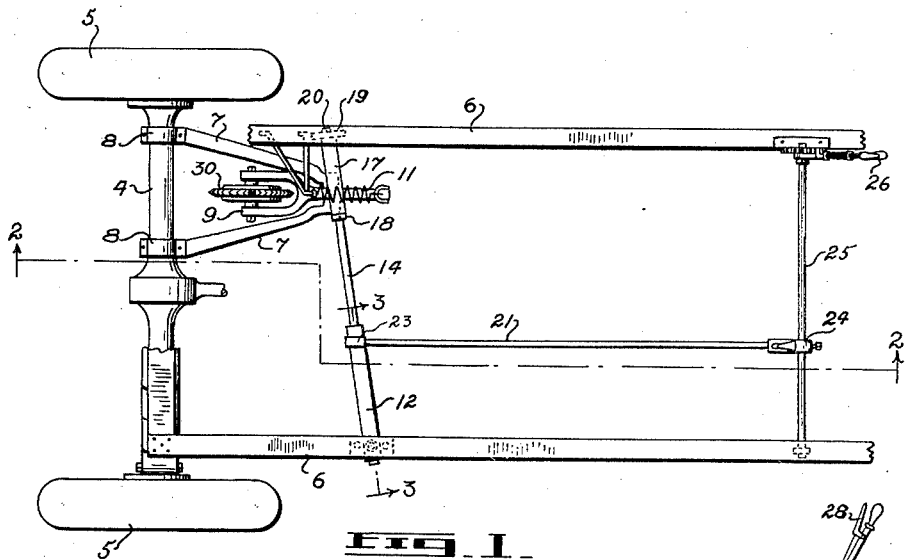
Figure 1 is a broken section of an automobile chassis showing the rear wheels and the axle upon which my gripping device is mounted.
Figure 2:
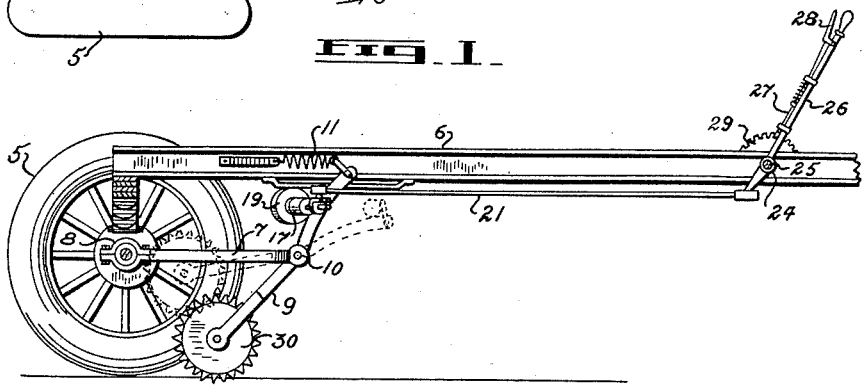
Figure 2 is a transverse section on line 2—2, Figure 1.

Referring more particularly to Figure 1, 4 is the rear axle of the car. 5, 5, represent the wheels, and 6, 6, the side beams of the chassis. To the rear axle 4 is fastened a bracket 7 by means of clamps 8. The end of bracket 7 terminates in a bearing for the gripping wheel arm 9, which is pivoted to bracket 7 by means of a bolt 10. Arm 9 is conformed as follows: A straight portion from the gripping wheel 30 up to the fulcrum 10, then curved outwardly, for a purpose hereinafter described.

In order to maintain the gripping wheel firmly on the road, the upper end of arm 9 is provided with a spring 11 connected to the side of the chassis 6. This spring is tensioned to sufficiently press the wheel on the roadway so that skidding will be prevented. The arm 9 is forked to afford a substantial mounting for the wheel.

In order to raise the wheel from the road, the following mechanism is used: A bearing bracket 12 is provided composed of a member having at each end thereof a flange 13 perforated to form a bearing for a rod 14. This member is pivoted to the side of the chassis at 16. Rod 14 is provided with collars 15, mounted as shown, to prevent the same from moving longitudinally. It extends across the chassis and has adjacent its free end a roller 17 retained by a collar 18 and a wheel 19 mounted on the outer end of rod 14 and provided with a collar 20 to hold the same in position. It will be seen that roller 17 is positioned to engage the curved end of arm 9 so as to travel thereon to raise or lower the antiskid wheel.

Figure 3:
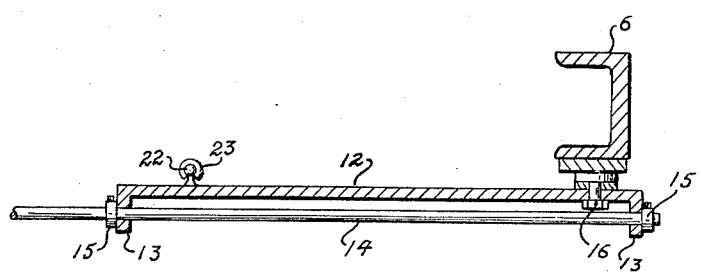
Figure 3 is a section of the bracket bearing, taken on line 3—3, Figure 1.

To actuate rod 14 from the driver's seat, the following arrangement is provided: On the bearing bracket 12 is pivoted a rod 21, shown in Figure 3 as mounted on a ball-bearing 22 by means of a socket 23 engaging the ball-bearing 22. The free end of rod 21 is fork shaped so as to receive a rocker arm 24, which is rigidly fastened to a rocker shaft 25 mounted in bearings on the sides of the chassis. A lever 26, provided with a pawl 27 and connected by means of a rod to a handpiece 28, is fixedly mounted on said rocker shaft, said pawl travelling on a rack sector 29 to adjust the position of the shaft.

In operation, the device is actuated as follows: When it is desired to lower the gripping wheel so that the same will prevent the car from skidding, lever 26 is manipulated to disengage pawl 27 from sector 29. This will cause the rod 21 to travel rearwardly on the curved end of arm 9, thereby allowing the wheel to be lowered onto the road. The tension spring 11 will afford sufficient pressure to cause the wheel to grip the road and prevent the car from skidding. To raise the wheel, arm 26 is manipulated in the reverse direction to that above described. In order to cause the rod 14 to travel freely over the arm 9, antifriction roller 17 is provided. So that the arm will travel freely on the chassis 6, wheel 19 is mounted on the arm and positioned so as to travel on the under-flange of the chassis. Roller 17 will have a contrary rotation to that of wheel 19.

The antiskid wheel may be of various forms, the one shown herewith having indentations, but a plain disc could be substituted.

The foregoing description refers to a form of my invention well adapted for the purpose set forth. Changes, however, may be made without departing from the spirit of the invention as covered by the appended claims.

What I claim as new and useful, and desire to secure by Letters Patent, is:—

1. In an antiskid device of the class described, a forked bracket mounted on the rear axle, a perforation at the free end of said bracket, an arm having a perforation about medially thereof, a pin passing through the perforation of said bracket and said arm, an antiskid wheel mounted at the lower end of said arm, a spring mounted at the upper end of said arm positioned so as to press said antiskid wheel on the road, and means to lower and raise said wheel.

2. An antiskid device comprising a bracket rigidly mounted on the rear axle, a bearing at the free end of said bracket, an arm pivoted on said bracket about medially of its length, a fork-like portion at the lower end of said arm, a wheel pivoted in said fork, a perforation at the upper end of said arm, a spring mounted in said perforation, and means to fasten the other end of said spring to the side of the chassis.

3. In an antiskid device of the class described, an arm pivoted about medially of its length, an antiskid wheel carried by the lower end of said arm, means at the upper end of said arm to tension the same so as to press the wheel against the road, means to raise said arm, comprising a cross rod, an antifriction roller on said cross rod positioned to travel on the upper end of said arm, an antifriction wheel at the end of said cross rod positioned to travel on the underside of the chassis of a car, and means accessible to the driver to operate said arm so as to lower or raise the antiskid wheel.

4. In an antiskid device of the class described, a bracket rigidly mounted on the rear axle of a car, an arm pivoted medially of its length on the free end of said bracket, an antiskid wheel mounted on the lower end of said arm, a tension device connected to the upper end of the same, means to raise or lower said antiskid wheel comprising a bearing bracket pivotally mounted on the chassis of a car, a rod journalled in said bracket, an antifriction roller mounted on the free end of said rod and positioned to travel on the upper end of said arm, means to move said rod to and fro, comprising a rod pivoted thereto, a rocker shaft mounted across the chassis adjacent the front end thereof, a rocker arm mounted on said shaft and connected to said last-mentioned rod, a lever on said shaft mounted accessible to the driver, and means to retain said lever in any desired position.

In testimony of the foregoing, I have hereto affixed my signature, this 1st day of March, 1929, at the city of St. Thomas.

JOHN J. FINNEGAN.